United States Patent
Doctor et al.

(10) Patent No.: US 10,129,270 B2
(45) Date of Patent: Nov. 13, 2018

(54) APPARATUS, SYSTEM AND METHOD FOR IDENTIFYING AND MITIGATING MALICIOUS NETWORK THREATS

(71) Applicant: Level 3 Communications, LLC, Broomfield, CO (US)

(72) Inventors: Brad Bernay Doctor, Golden, CO (US); Skyler Jameson Bingham, Superior, CO (US); Keshava Berg, Lafayette, CO (US); John Sherwood Reynolds, II, Westminster, CO (US); Justin George Mohr, Westminster, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 775 days.

(21) Appl. No.: 14/039,251

(22) Filed: Sep. 27, 2013

(65) Prior Publication Data

US 2014/0096251 A1    Apr. 3, 2014

Related U.S. Application Data

(60) Provisional application No. 61/707,310, filed on Sep. 28, 2012.

(51) Int. Cl.
*H04L 29/06* (2006.01)
*G06F 21/55* (2013.01)

(52) U.S. Cl.
CPC .......... *H04L 63/1408* (2013.01); *G06F 21/55* (2013.01); *H04L 63/1441* (2013.01); *H04L 2463/142* (2013.01); *H04L 2463/144* (2013.01)

(58) Field of Classification Search
CPC ............. H04L 63/1408; H04L 63/1441; H04L 2463/142; H04L 2463/144; G06F 21/55
USPC ........................................ 726/23, 22, 24, 25
See application file for complete search history.

(56) References Cited

U.S. PATENT DOCUMENTS

| | | | | |
|---|---|---|---|---|
| 6,134,664 A | * | 10/2000 | Walker | G06F 21/552 726/22 |
| 6,671,818 B1 | * | 12/2003 | Mikurak | G06Q 10/06 714/4.21 |
| 7,808,958 B1 | * | 10/2010 | Hernacki | H04W 12/12 370/229 |
| 7,870,610 B1 | * | 1/2011 | Mitchell | G06F 21/53 726/22 |
| 7,916,664 B2 | * | 3/2011 | Krishnamurthy | H04L 45/00 370/254 |
| 8,201,257 B1 | * | 6/2012 | Andres | G06F 21/568 726/23 |

(Continued)

OTHER PUBLICATIONS

Gu et al., BotSniffer: Detecting Botnet Command and Control Channels in Network Traffic, Proceedings of the 15th Annual Network and Distributed System Security Symposium (NDSS'08), San Diego, Calif., Feb. 2008.*

(Continued)

*Primary Examiner* — David Garcia Cervetti

(57) ABSTRACT

Implementations of the present disclosure involve a system and/or method for identifying and mitigating malicious network threats. Network data associated is retrieved from various sources across a network and analyzed to identify a malicious network threat. When a threat is found, the system performs a mitigating action to neutralize the malicious network threat.

16 Claims, 5 Drawing Sheets

(56) References Cited

U.S. PATENT DOCUMENTS

| | | | | |
|---|---|---|---|---|
| 8,204,984 B1* | 6/2012 | Aziz | | H04L 63/0227 709/224 |
| 8,220,056 B2 | 7/2012 | Owens | | |
| 8,230,480 B2* | 7/2012 | Fazal | | H04L 63/065 709/225 |
| 8,260,914 B1* | 9/2012 | Ranjan | | H04L 61/1511 709/224 |
| 8,438,644 B2 | 5/2013 | Watters | | |
| 8,555,388 B1* | 10/2013 | Wang | | H04L 63/1416 726/23 |
| 8,561,177 B1* | 10/2013 | Aziz | | G06F 21/554 726/22 |
| 8,561,187 B1* | 10/2013 | Hegli | | H04L 63/1491 726/22 |
| 8,566,928 B2* | 10/2013 | Dagon | | H04L 29/12066 726/22 |
| 8,578,493 B1* | 11/2013 | Cowan | | G06F 21/554 709/224 |
| 8,578,497 B2* | 11/2013 | Antonakakis | | G06F 21/577 726/24 |
| 8,631,489 B2* | 1/2014 | Antonakakis | | H04L 61/1511 709/223 |
| 8,682,812 B1* | 3/2014 | Ranjan | | H04L 63/1425 706/12 |
| 8,745,737 B2* | 6/2014 | Thomas | | H04L 63/1416 726/22 |
| 8,806,632 B2 | 8/2014 | Stefanidakis et al. | | |
| 8,813,228 B2* | 8/2014 | Magee | | G06F 21/577 713/187 |
| 8,826,438 B2* | 9/2014 | Perdisci | | G06F 21/56 726/24 |
| 8,881,281 B1 | 11/2014 | Mitchell | | |
| 9,027,135 B1* | 5/2015 | Aziz | | H04L 63/1408 726/23 |
| 9,092,616 B2 | 7/2015 | Kumar | | |
| 9,106,680 B2* | 8/2015 | Alperovitch | | H04L 63/14 |
| 9,118,702 B2 | 8/2015 | Macaulay | | |
| 9,148,424 B1 | 9/2015 | Yang | | |
| 9,166,994 B2* | 10/2015 | Ward | | H04L 63/1425 |
| 9,356,942 B1* | 5/2016 | Joffe | | H04L 63/1408 |
| 9,516,058 B2* | 12/2016 | Antonakakis | | H04L 63/1483 |
| 9,628,498 B1* | 4/2017 | Aziz | | H04L 63/1408 |
| 9,680,861 B2* | 6/2017 | Ward | | H04L 63/1441 |
| 9,762,596 B2* | 9/2017 | Wang | | H04L 63/1416 |
| 9,894,088 B2* | 2/2018 | Ward | | H04L 63/1425 |
| 10,027,688 B2* | 7/2018 | Perdisci | | H04L 63/1416 |
| 2002/0087882 A1* | 7/2002 | Schneier | | G06F 21/552 726/23 |
| 2003/0028585 A1* | 2/2003 | Yeager | | G06F 9/4416 709/201 |
| 2003/0084349 A1* | 5/2003 | Friedrichs | | G06F 21/55 726/22 |
| 2004/0044912 A1* | 3/2004 | Connary | | H04L 43/045 726/23 |
| 2006/0021034 A1* | 1/2006 | Cook | | H04L 63/083 726/22 |
| 2006/0021045 A1* | 1/2006 | Cook | | H04L 63/1433 726/25 |
| 2006/0021046 A1* | 1/2006 | Cook | | G06F 21/577 726/25 |
| 2006/0021047 A1* | 1/2006 | Cook | | H04L 63/1433 726/25 |
| 2006/0021048 A1* | 1/2006 | Cook | | G06F 21/577 726/25 |
| 2006/0021049 A1* | 1/2006 | Cook | | G06F 21/577 726/25 |
| 2006/0021050 A1* | 1/2006 | Cook | | G06F 21/577 726/25 |
| 2006/0064740 A1 | 3/2006 | Kelley | | |
| 2007/0266093 A1* | 11/2007 | Forstall | | G06F 3/04817 709/204 |
| 2008/0016339 A1* | 1/2008 | Shukla | | G06F 21/53 713/164 |
| 2008/0080518 A1* | 4/2008 | Hoeflin | | H04L 63/1416 370/395.42 |
| 2008/0148398 A1* | 6/2008 | Mezack | | G06F 21/55 726/22 |
| 2008/0184218 A1* | 7/2008 | Largman | | G06F 8/65 717/168 |
| 2009/0119681 A1* | 5/2009 | Bhogal | | G06F 21/554 719/318 |
| 2009/0119778 A1* | 5/2009 | Bhuyan | | G06F 9/441 726/25 |
| 2009/0138427 A1 | 5/2009 | Kalavade | | |
| 2009/0238077 A1* | 9/2009 | Bajpay | | H04L 41/0681 370/241 |
| 2010/0162396 A1* | 6/2010 | Liu | | G06F 21/566 726/23 |
| 2010/0211997 A1 | 8/2010 | McGeehan | | |
| 2010/0281388 A1* | 11/2010 | Kane | | H04L 41/0213 715/736 |
| 2011/0041003 A1* | 2/2011 | Pattar | | H04W 12/10 714/4.3 |
| 2011/0060947 A1* | 3/2011 | Song | | G06F 21/53 714/37 |
| 2011/0066686 A1* | 3/2011 | Gamaley | | H04L 12/1822 709/206 |
| 2011/0173699 A1 | 7/2011 | Figlin et al. | | |
| 2011/0179164 A1* | 7/2011 | Memon | | H04L 63/1441 709/224 |
| 2011/0239297 A1* | 9/2011 | Unagami | | G06F 21/55 726/22 |
| 2011/0320816 A1* | 12/2011 | Yao | | G06F 21/316 713/171 |
| 2012/0123806 A1* | 5/2012 | Schumann, Jr. | | G06Q 40/08 705/4 |
| 2012/0151033 A1* | 6/2012 | Baliga | | H04L 63/1425 709/224 |
| 2012/0204264 A1* | 8/2012 | Jiang | | H04L 41/12 726/23 |
| 2012/0233694 A1* | 9/2012 | Baliga | | G06F 21/568 726/23 |
| 2012/0311708 A1 | 12/2012 | Agarwal | | |
| 2012/0311710 A1* | 12/2012 | Butler | | G06F 21/51 726/24 |
| 2013/0073851 A1* | 3/2013 | Hashimoto | | H04L 9/3247 713/168 |
| 2013/0074143 A1* | 3/2013 | Bu | | H04L 63/1416 726/1 |
| 2013/0097655 A1* | 4/2013 | Vaidyanathan | | G06F 21/55 726/1 |
| 2013/0117847 A1* | 5/2013 | Friedman | | H04L 63/102 726/22 |
| 2013/0185198 A1* | 7/2013 | Lorch | | G06Q 20/29 705/39 |
| 2013/0254260 A1 | 9/2013 | Stevens et al. | | |
| 2013/0298192 A1 | 11/2013 | Kumar | | |
| 2013/0318610 A1* | 11/2013 | Zaitsev | | G06F 21/56 726/24 |
| 2013/0340080 A1* | 12/2013 | Gostev | | H04L 63/145 726/24 |
| 2013/0347114 A1* | 12/2013 | Altman | | H04L 63/1425 726/24 |
| 2014/0059683 A1* | 2/2014 | Ashley | | G06F 21/552 726/23 |
| 2014/0223555 A1* | 8/2014 | Sanz Hernando | | G06F 21/55 726/22 |
| 2015/0207809 A1* | 7/2015 | Macaulay | | G06F 21/552 726/22 |
| 2016/0065597 A1 | 3/2016 | Nguyen | | |

OTHER PUBLICATIONS

International Search Report, dated Apr. 9, 2014, Int'l Appl. No. PCT/US13/062186, Int'l Filing Date Sep. 27, 2013; 3 pgs.

(56) References Cited

OTHER PUBLICATIONS

Written Opinion of the International Searching Authority, dated Apr. 9, 2014, Int'l Appl. No. PCT/US13/062186, Int'l Filing Date Sep. 27, 2013; 6 pgs.
U.S. Appl. No. 14/683,964, filed Apr. 10, 2015, Bingham et al.
International Preliminary Report on Patentability, dated Mar. 31, 2015, Int'l Appl. No. PCT/US13/062186, Int'l Filing Date Sep. 27, 2013; 10 pgs.
International Preliminary Report on Patentability dated Oct. 10, 2017, Int'l Appl. No. PCT/US16/026131, Int'l Filing Date Apr. 6, 2016; 8 pgs.
Extended European Search Report, dated Jul. 18, 201, Application No. 16777161.7, filed Apr. 6, 2016; 8 pgs.
Antonakakis, Manos et al., "Building a Dynamic Reputation System for DNS", XP061011124; [retrieved on Jun. 4, 2010] Jun. 4, 2010, pp. 1-17.
International Search Report dated Jul. 27, 2016, Int'l Appl. No. PCT/US16/026131, Int'l Filing Date Apr. 6, 2016; 3 pgs.
Written Opinion of the International Searching Authority dated Jul. 27, 2016, Int'l Appl. No. PCT/US16/026131, Int'l Filing Date Apr. 6, 2016; 6 pgs.
Moura, "Internet Bad Neighborhoods", Centre for Telematics and Information Technology, CTIT, Ph.D.—thesis Series No. 120237, ISBN 978-90-365-3650-4, ISSN 1381-3617, DOI 10.3990/1.9789036534604 Mar. 1, 2014, 240 pgs.

* cited by examiner

US 10,129,270 B2

APPARATUS, SYSTEM AND METHOD FOR IDENTIFYING AND MITIGATING MALICIOUS NETWORK THREATS

CROSS-REFERENCE TO RELATED APPLICATION

Aspects of the present disclosure are described in and claim priority under 35 U.S.C. § 119(e) to U.S. Provisional Patent Application No. 61/707,310, titled "Apparatus, System and Method for Identifying and Mitigating Malicious Network Threats," filed on Sep. 28, 2012, the disclosure of which is hereby incorporated by reference.

FIELD OF THE DISCLOSURE

Aspects of the present disclosure involve the identification and mitigation of malicious network threats. Network traffic data is collected from a variety of sources and analyzed to identify a potential threat. The threat may then be mitigated according to the type of threat.

BACKGROUND

The Internet and networks in general are infested with numerous malicious actors that use various forms of malware to damage computers, steal data and intellectual property, interrupt communications, extort businesses and individuals, and steal personal data and money, among other nefarious acts. Thus, numerous different mechanisms have been designed and developed to detect, identify, block, prevent, mitigate and otherwise thwart such malware. As such defensive technologies have advanced the bad actors have developed new malware to continue with their malicious acts. Thus, there is an ongoing and continuous need to improve the ability to detect malicious network threats, identify the bad actors, and/or mitigate the effects of such threats, and eliminate such threats, among other goals.

SUMMARY

Implementations of the present disclosure involve a system and/or method for identifying and mitigating malicious network threats. More specifically, the system and method allow for the analysis of network data collected by a number of sources to identify the presence of a malicious network threat. Features or the network data may be weighted and analyzed to generate a risk score for predicting malicious activities. Malicious threats may then be mitigated according to the nature of the threat. A database with information related to the identified threat may be updated and information related to the threat may be relayed to third parties.

BRIEF DESCRIPTION OF THE FIGURES

Aspects of the present disclosure may be better understood and its numerous objects, features, and advantages made apparent to those skilled in the art by referencing the accompanying drawings. It should be understood that these drawings depict only typical embodiments of the present disclosure and, therefore, are not to be considered limiting in scope.

DETAILED DESCRIPTION

Aspects of the present disclosure involve detecting malicious network threats, identifying the origin of such threats, identifying the location of such threats, and/or mitigate the effects of such threats, among other things, in a network. The system may take such actions based on a limited set of information concerning network traffic. Aspects of the present disclosure take advantage of various network attributes, statistics, behavior and other data as described in U.S. patent application Ser. No. 12/698,004, titled "Analysis of Network Traffic," filed on Feb. 1, 2010, the disclosure of which is hereby incorporated by reference.

Figure 1:
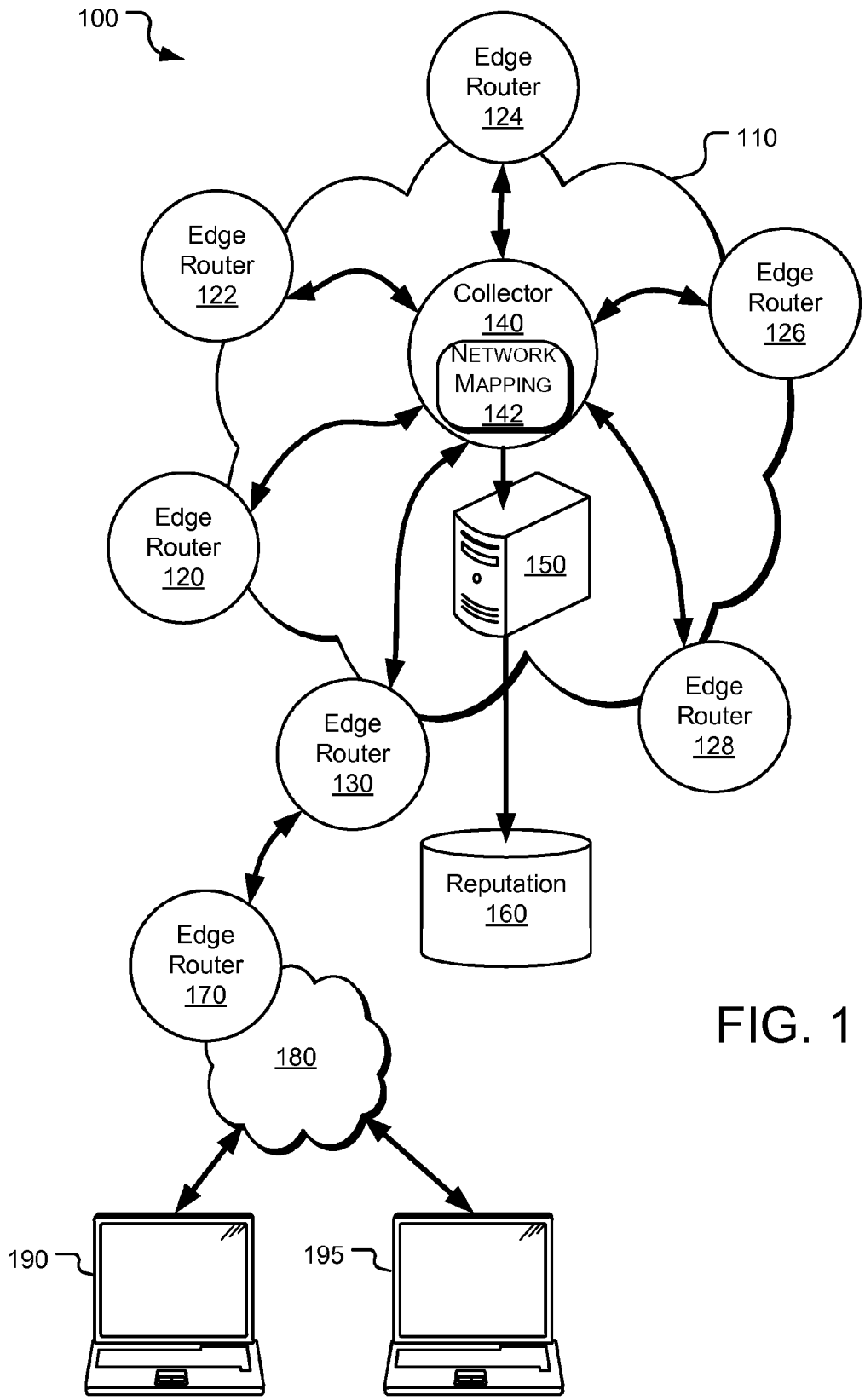
FIG. 1 is a system diagram depicting a network, which may be a backbone network, configured to collect network traffic and identify malicious network threats from such network traffic data.

In one specific example illustrated in FIG. 1, a network 100 configured to collect network traffic and identify malicious networks threats is depicted. The network 100 includes a first computer network 110, which includes a large number of different types of interconnected components including routers, switches, gateways, servers, etc., interconnected with fiber or other communication mediums. In particular, the first computer network 110 includes a plurality of edge routers 120-130 around the logical periphery of the first computer network 110. In one specific example, the first network 110 may be considered a primary network or backbone network that may carry traffic for other networks, such as the second computer network 180.

Edge routers typically receive and transmit network traffic to and from edge routers of other networks, which may be considered peer networks. For example, the first computer network 110 may connect to a second computer network 180 via an edge router 130 at the logical periphery of the first computer network and an edge router 170 at the logical periphery of the second computer network 180. Each edge router 120-130 has one or more interfaces for sending and receiving network traffic. In this example, a first edge router 130 from the first computer network 110 is connected to a second edge router 170 from the second computer network 180. Computing devices 190,195, such as personal computers, laptop computers, tablet computers, and other electronic devices, are connected to the second computer network 180, but are able to access the first computer network 110 and any other networks logically connected to the first computer network 110. Thus, data may travel from one of the computing devices 190,195, through the second network edge router 170, to the first network edge router 130, and to a destination on the first computer network 110 and vice versa.

Each edge router 120-130 of the first computer network 110 may also operate a traffic monitoring application for logging the traffic being routed through the edge router. The traffic may be logged by taking periodic snapshots that describe the traffic flowing through the edge router (e.g. entering or leaving the first computer network 110). For example, the computing devices 190,195 may each be connected to one or more servers that are logically connected to the first computing network 110. The first edge router may take a snapshot that includes any network data associated with the actions of the computing devices 190, 195. Details regarding the network data collected are discussed below. The snapshots may be provided to one or more network flow collectors 140 operating within the first computer network 110.

A network flow collector 140 generally receives network data and statistics from one or more traffic monitoring applications, consolidates the data, and provides information related to the identity of who sends and receives network traffic at each edge router in the first computer network 110. The network flow collector 140 may operate on one of the edge routers 120-130 or may operate on an independent system working in association with the edge routers 120-130. The information accumulated by the network flow collector 140 may for example include, an edge router identifier, an interface identifier for the particular edge router (in the case of multiple network interfaces per router), a source port, a destination port, an origin Autonomous System (AS) number, an origin AS name, a destination AS number, and/or any other network data information. Such information may also include an estimation or approximation of the amount traffic transceived at that particular ingress interface of an edge router 120-130, as well as the rate of the traffic flowing through the edge router 120-130.

For example, a computer user may want to visit a website that is hosted on a server connected to the first computer network 110. The computer user enters in the address of the website and the user's electronic device 190 may send a request for data for displaying the website to the second computer network 180. The request may be routed from the second computer network 180 to the first computer network 110 through the edge routers 170, 130 that logically connect the two networks. The edge router 130 of the first computer network 110 may take a snapshot of the traffic passing through the edge router 130 that includes an identifier for the edge router 130, an AS number and name for the computer user's electronic device 190, and a AS number for the destination server. This snapshot may then be uploaded to the network flow collector 140. In another example, the website may be hosted on a server connected to a third network (not depicted) via one of the other edge routers (120-128). As data is being passed between the first computer user's electronic device 190 and the server snapshots may be taken of the traffic at each of the edge routers the traffic passes through (here edge router 130 and one of edge routers 120-128). The snapshots from each of edge routers may then be uploaded to the network flow collector 140. Thus, the data collected by the network flow collector 140 will show traffic entering and leaving the first computer network 110.

The traffic monitoring application may also include a traffic measurement aggregator module (not shown) logically connected to each edge router interface. The traffic monitoring application may be located at one or more of the edge routers 120-130, or located somewhere within the first network 110. The traffic measurement aggregator modules are configured for collecting network data and statistics to provide information related to an amount (or rate) of data transceived at a particular edge router interface. The traffic measurement aggregator module is able to quickly and accurately determine the amount (or rate) of network traffic since it is directly associated with each edge router interface. Thus, the traffic measurement aggregator module is typically more accurate than the traffic measurement provided by the network flow collector 140 since the traffic measurement aggregator module is directly associated with to each edge router interface instead of receiving periodic snapshot data. The traffic measurement aggregator module generally does not, however, record who sent or who received this network traffic.

In one example, the traffic aggregator module may utilize simple network management protocol (SNMP) counters and/or SNMP messaging to determine the amount of network traffic passing through an edge router interface. A SNMP counter may be integrated in each edge router 120-130 and be configured to measure the number of octets that have been sent or received by the edge router's interfaces. Thus, the traffic aggregator module may poll the SNMP counter and determine the amount of network traffic sent to or received at the edge router interface. A traffic rate may be calculated by comparing two readings from the SNMP counter, determining the difference, and dividing by the time between the readings. Similarly, SNMP messages can be used to query the current amount of network traffic at any time. A SNMP request for information may be sent to each connected device and network status and usage information may be returned.

A network mapping enrichment module 142 may also be used to monitor and collect network data. The network mapping enrichment module 142 is configured to collect network data from border gateway protocol (BGP) tables associated with the first computer network's 110 (a primary network) connectivity relationships with its secondary networks (e.g. the second computer network 180). BGP information and tables may also be obtained from third party vendors that gather and distribute such collections of data. The BGP tables include, for example, routing tables that are advertised by secondary networks. The routing tables have connectivity information (e.g., IP addresses, AS paths, etc.) that describes which destinations are reachable from a particular ingress router in a secondary network that interfaces with an egress router in the primary network. Furthermore, the BGP tables associated with the various secondary networks can be localized into one or more aggregated BGP tables within a primary network (the first computer network 110), thus providing a more global and complete view of the primary network's connectivity with its secondary networks. In particular, the mapping of network connectivity may provide egress AS numbers associated with network traffic. With egress AS numbers, it can be determined to which secondary network (i.e., directly interfaced network) the traffic is being sent (via an egress router interface of the primary network). Although depicted as a part of the network flow collector 140, the network mapping enrichment module 142 may operate independently from the network flow collector 140 on an independent system.

Network data that is collected at the network flow collector 140 and other collection modules may be sent to a processing cluster 150, such as a Hadoop® cluster, where the data from throughout the network is aggregated and processed. In one example the network data that is retrieved by the network flow collector 140 may be formatted in comma separated value form (CSV), JavaScript Object Notation form (JSON), or any other text-based format. The processing cluster 150 analyzes the network data to identify malicious traffic patterns using the network data in conjunction with previously accumulated network data stored in the reputation database 160. The processing cluster 150 also updates a reputation database 160 according to the analysis for future use. In one embodiment, the processing cluster 150 includes a distributed computing system. As data is received from the collector and various modules, it may be distributed by a load balancer to ingester nodes. The ingester nodes may then further distribute the data to insertion nodes which filter, normalize, aggregate, and decorate the data and insert it into a database located in a distributed file system.

Figure 2:
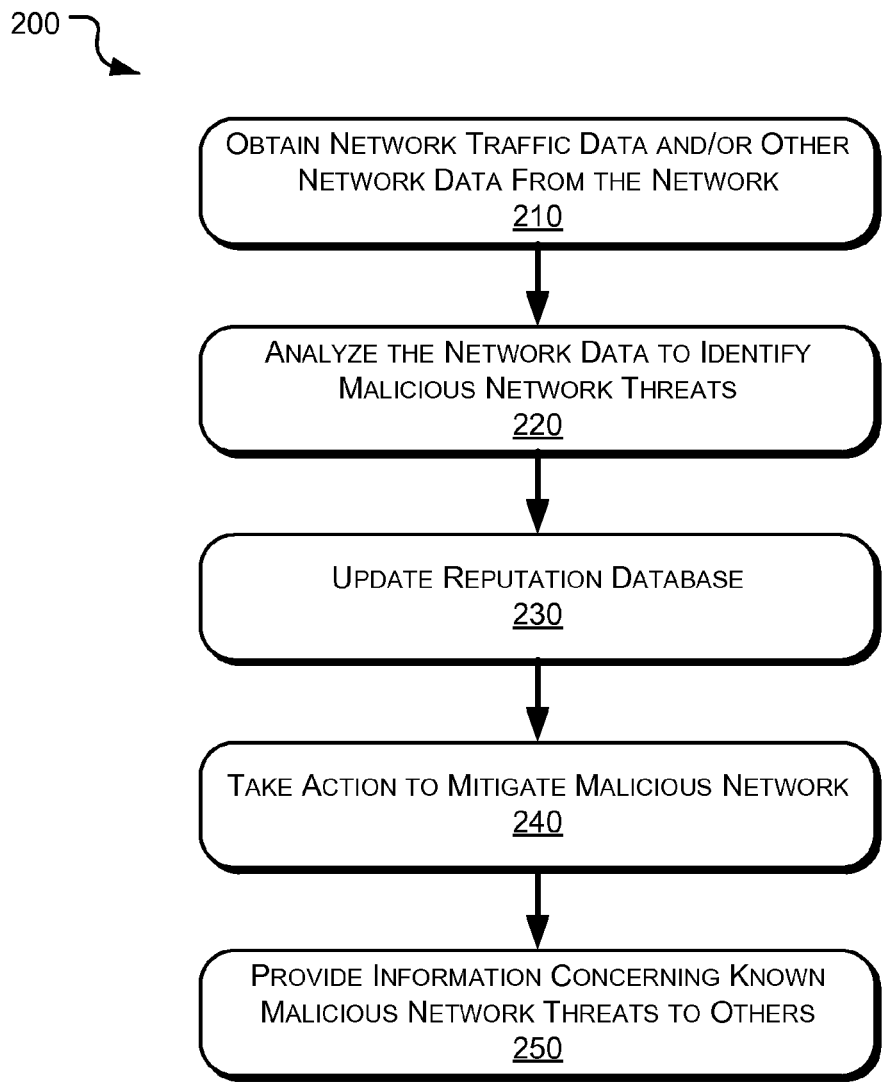
FIG. 2 is a flow diagram of one particular method for identifying and mitigating malicious network threats, including identifying the threats, creating and updating a reputation database, taking mitigating actions against such threats and/or pushing reputation information to client firewalls and other client defensive systems.

Referring now to FIG. 2, a method for identifying and mitigating malicious network threats 200 is depicted. The processing cluster 150 receives network traffic data collected by the network flow collector 140, the traffic measurement aggregator module, the network mapping enrichment module 142, and/or any other network data collecting device (operation 210). Various applications may operate on the processing cluster 150 to analyze the collected data and detect malicious network threats by analyzing the network data as well as network traffic patterns. The processing cluster 150 identifies any malicious traffic patterns, malicious data, sources of malware, compromised or infected computers, computers issuing commands or otherwise controlling the compromised/infected computers, suspect networks, and any other malicious network threats (operation 220). The processing cluster 150 also uploads network data associated with the identified malicious network activity to the reputation database 160 (operation 230). The system then takes an appropriate action to mitigate the particular malicious network activity (operation 240). For example, the system may null route the malicious network traffic, logically separate a malicious network, and/or take any other action that effectively eliminates the threat. Information related to the threat may also be provided to other networks so that they may also block the malicious activity (operation 250). For example, information related to a malicious threat may be pushed to firewalls on a friendly network so that the firewalls may block any traffic coming from the threat.

For example, many forms of malware involve the use of a botnet. Generally speaking, a botnet is a collection of malware infected computers that are being used, typically without the owner's knowledge, for malicious, illegal, and otherwise improper purposes. Typically, malware is distributed from one or more computers and the malware allows for a remote user to take control of the infected computer creating a bot. One type of attack that may emanate from a botnet is a denial of service (DOS) attack. At a high level, a DOS attack involves sending a large volume of requests to a website or other service, thereby overwhelming the site and causing it to crash or effectively crash by using all of the bandwidth the site has available. The likelihood of success of such an attack is increased when the attack emanates from many machines. Thus, botnets are often used to perform what is referred to as a Distributed DOS (DDOS) attack. Distributed DNS attacks are both difficult to identify and prevent because the attack originates from multiple computers in multiple locations.

In operations, network data is collected by the network collector 140 and modules as discussed above (operation 210). The network data is then aggregated and processed to identify a DOS or DDOS attack through traffic patterns, volume of traffic, and rate (operation 220). Assuming, for example, that a DDOS attack initially starts with malware infected computers, and then using network traffic data, the present system identifies the infected computers by recognizing the occurrence of a DDOS attack and tracing back the sources of the attack. Since bots are typically controlled by some other computer, network traffic data may be used to identify the source of communications to the bot, which may be the bot command computer or computers by tracing communications being sent to each bot, back to the communications origination. Thus, a bot command computer(s) may be identified by tracing communications back from the target of the DDOS attack, to the bots performing the DDOS attack, and then to the bot command computer that communicated with the bots. Information related to the attack, the attacking bots, and the bot command computer may be uploaded to the reputation database (operation 230).

When these various infected or distributing computers are identified, various steps may then be taken to eliminate, reduce or otherwise mitigate the bad actions through the use of null routes, access control list (ACL) blocks, publications of lists identifying bad actors and pushes to client firewalls (operations 250, 260). For example, any traffic from the bot command computer to the bots may be blocked from passing through the first computer network 110 by routing the data to a null route that leads to nowhere. In another example, the infrastructure equipment such as routers, switches, and firewalls may include ACLs to only permitting specifically authorized traffic to the infrastructure equipment. An attack may be mitigated by updating ACLs to specifically block the malicious threat. Threats may further be mitigated by publishing information related to the threat. The published information may then be used by third parties to block the threat on their systems. For example, antivirus and anti-malware producers may use the published information to provide updates for their software to remove the malware utilized by a botnet.

In another example, the initial transmission of bots or other malware may be identified by the processing cluster 150 based on a series of the same size packets emanating from a common location and being transmitted to multiple locations. This pattern may indicate some form of malware distribution. The similarity of the packets may be based on a statistically analysis of a subset of all of the packets sent in the actual malware transmission. Other characteristics of the transmitted data may also be used to improve the confidence that the algorithm is correctly identifying malware. For example, the system can also identify the port from which the packets emanate. Data is often sent from ports 20 (FTP data transfer) or 80 (http); so, data streams emanating from other ports may be identified as suspicious by the processing cluster 150 and one or more mitigating operations may be established in response.

In general, the data available at any given router is sparse due, in part, to the sheer volume of traffic flowing with some networks and the practical ability to record and process such vast amounts of data. However, by collecting the data and then processing collectively in a cluster, greater visibility of the network overall is provided than at any given edge router. Further, a processing cluster can implement statistical methods and fingerprints to identify traffic likely associated with some form of malware or other malicious traffic. Past network statistics and fingerprint information may be stored in the reputation database 160 and accessed by the processing cluster 150 at any time. Moreover, the system may be configured to learn so that over time as more threats are identified and confirmed, fingerprints may be updated and improved so that should traffic or other network data suggest a threat, there will be ever increasing confidence that the threat is real and not a false positive.

In addition, the processing cluster or other computing device or devices may also access and/or generate reputation information for various computing devices accessible and/or communicating over a network. Besides the data collection and processing devices and methods described above, reputational data may be obtained from open source intelligence (OSI) sources, sensors on various networks (e.g., intrusion detection systems, honeypots, data collected in SPAM systems, DNS data, abuse complaint records, etc. The fingerprints may be combined with such reputational information from the reputation database and collectively used to identify malware, infected computers, computers distributing malware, networks from which malware emanates, etc. So, for example, certain networks connected to the Internet may over time become associated with various nefarious activities such as distributing malware, controlling bots, initiating DOS attacks, etc. Thus, if some of the patterns identified above, such as suspicious data emanating from an odd port to various computers, also originate from a network with a bad reputation, the system can identify the threat and react accordingly. For example, the system can cut off the server where the data is originating, intercept packets, or even cut off the AS number from the broader network.

Figure 3:
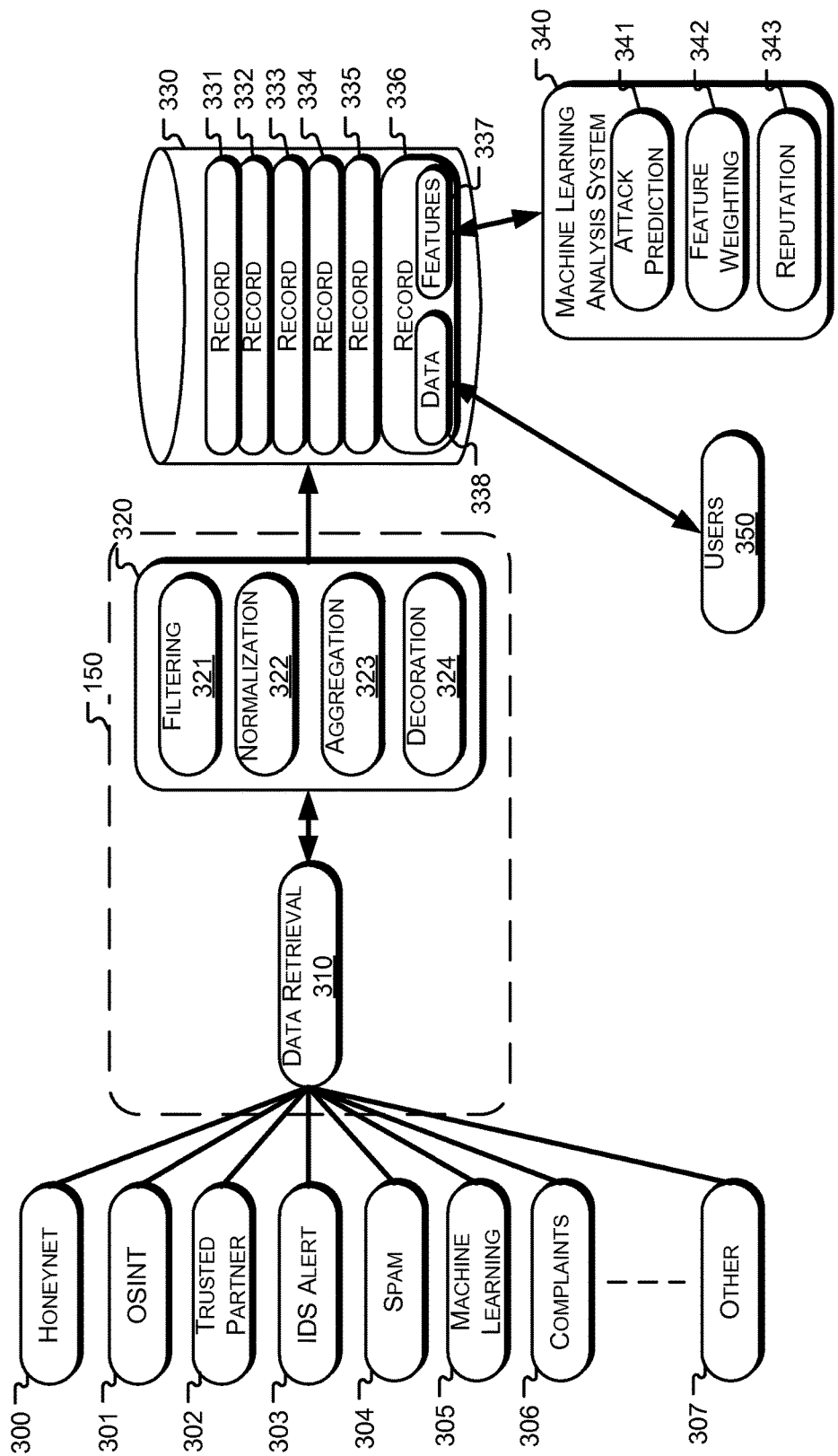
FIG. 3 is a system diagram outlining one particular implementation of a system for identifying and mitigating malicious network threats.
Figure 4:
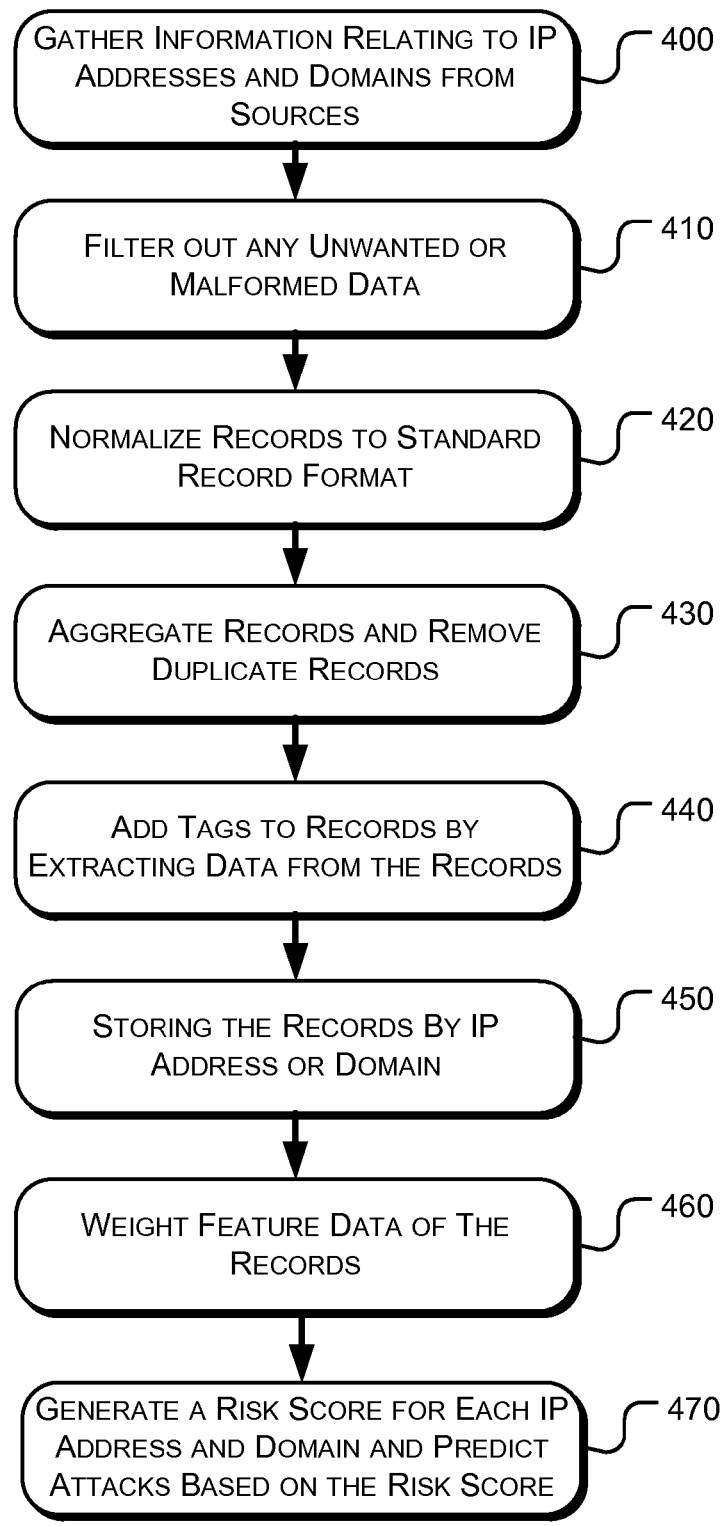
FIG. 4 is a flow diagram of one particular method for identifying and mitigating malicious network threats.

FIG. 3 depicts a more detailed system for identifying and mitigating malicious network threats. In this embodiment, the processing cluster 150 includes a data retrieval system and formatting system 320 and the reputation database 160 includes a database 330, a machine learning and analysis system 340, and user input 350. In alternative embodiments, the various computing systems may be combined onto a single computing system or may be further divided into a plurality of discrete systems. FIG. 4 depicts a process for identifying malicious systems. The system is configured to retrieve information from a variety of sources about domains and IP addresses that are known to host malicious activity. In general, the data is formatted, aggregated, stored, and analyzed to determine a risk level of an IP or domain and to predict potential attacks to a network.

A data retrieval system 310 of the processing cluster 150 regularly gathers information about IP addresses and domains from a variety of trusted sources 300-307 (operation 400). The sources may include any electronically accessible sources that have been selected by an administrator and have information related to the activities of IP addresses and domains. The sources 300-307 may include honeynets 300, Open Source Intelligence (OSINT) databases 301, trusted partner databases 302, intrusion detection system alerts 303, the origin of spam detected on the network 304, machine learning systems 305, abuse complaints 306 or any other source of information 307.

The data retrieval system 310 is responsible for the scheduling of retrieving data from the sources 300-307 as well as communicating in the appropriate manner with each source 300-307. This may include communicating with the sources 300-307 using a conventional network such as the Internet or an enterprise intranet. For example, a source that is accessible using the internet may have a specific API for accessing data stored by the source. The data retrieval system 310 is capable of connecting to the Internet and communicates with the source using the appropriate API.

As data is retrieved by the data retrieval system 310 from the sources, a data formatting system 320 may filter and package the data into a uniform record format for storage. This may be accomplished by passing the received data through a filtering system 321 configured to remove any unwanted or malformed information (operation 410). The filtered data is then passed to a normalization system 322 that repackages the data into a standard format (operation 420). The formatted data may then be passed to an aggregator 323 that is configured to combine multiple records for the same IP address or domain into a single record, as well as to remove any duplicate records (operation 430).

The aggregated records are transmitted to a decoration system 324 that adds tags to the records (operation 440). The tags include identifiers for the record and may be extracted from the data itself or retrieved from an internal or external source. For example, if a domain has previously been encountered, the system may retrieve tagging information from a previously created record. If a domain or IP address has never been encountered before, the system may perform a WHOIS lookup to retrieve the registered users or assignee of the domain, the domain name, a block of IP addresses associated with the domain, or any other information that may be received by a WHOIS lookup.

Once the data has been decorated, the system sends the decorated data to the reputation database 330 for storage (operation 450). The reputation database 330 may operate as a conventional database that is locally or remotely located. For example, the database 330 may operate on a distributed file system operating across multiple servers. The decorated data is stored as a record 331-336 in the database 330. The records are divided according to the record type, in this case, IP address records and domain records. Each record 331-336 includes two types of data, human readable data 338 and feature data 337. Human readable data 338 includes data that is in a user understandable format, while feature data 337 includes the same information in a computer readable format.

The database 330 may be accessed and modified by a machine learning analysis system 340 and by users 350. The machine learning analysis system 340 includes a feature weighting system 342, a reputation system 343, and an attack prediction system 341. The feature weighting system 342 is configured to assign a weight to each feature in a record that corresponds to a threat associated with that feature (operation 460). For example, the feature weighting system 342 may assign a low weight to features related to port 80 (the default port for unsecure internet connection) since it is common to have traffic on port 80. On the other hand, the feature weighting system 342 may add a higher weight to features related to a port that is not associated with common activity.

The reputation algorithm 343 may parse through the weighted features to generate a risk score for each IP address and domain. The reputation algorithm 343 evaluates the features and also may compare new activity to past activity, determining whether a system fits a profile for a malicious IP address or domain. For example, a computer operating at an IP address with no firewall operating, ports open, and outdated software, may not be an actual threat at a given time, but, given the computer's poor security, is likely to be a threat at a later time and receives a higher risk score than a secure computer. The attack prediction system 341 then correlates the risk score and changes in the risk score of an IP address or domain to determine if an attack is imminent (operation 470).

Figure 5:
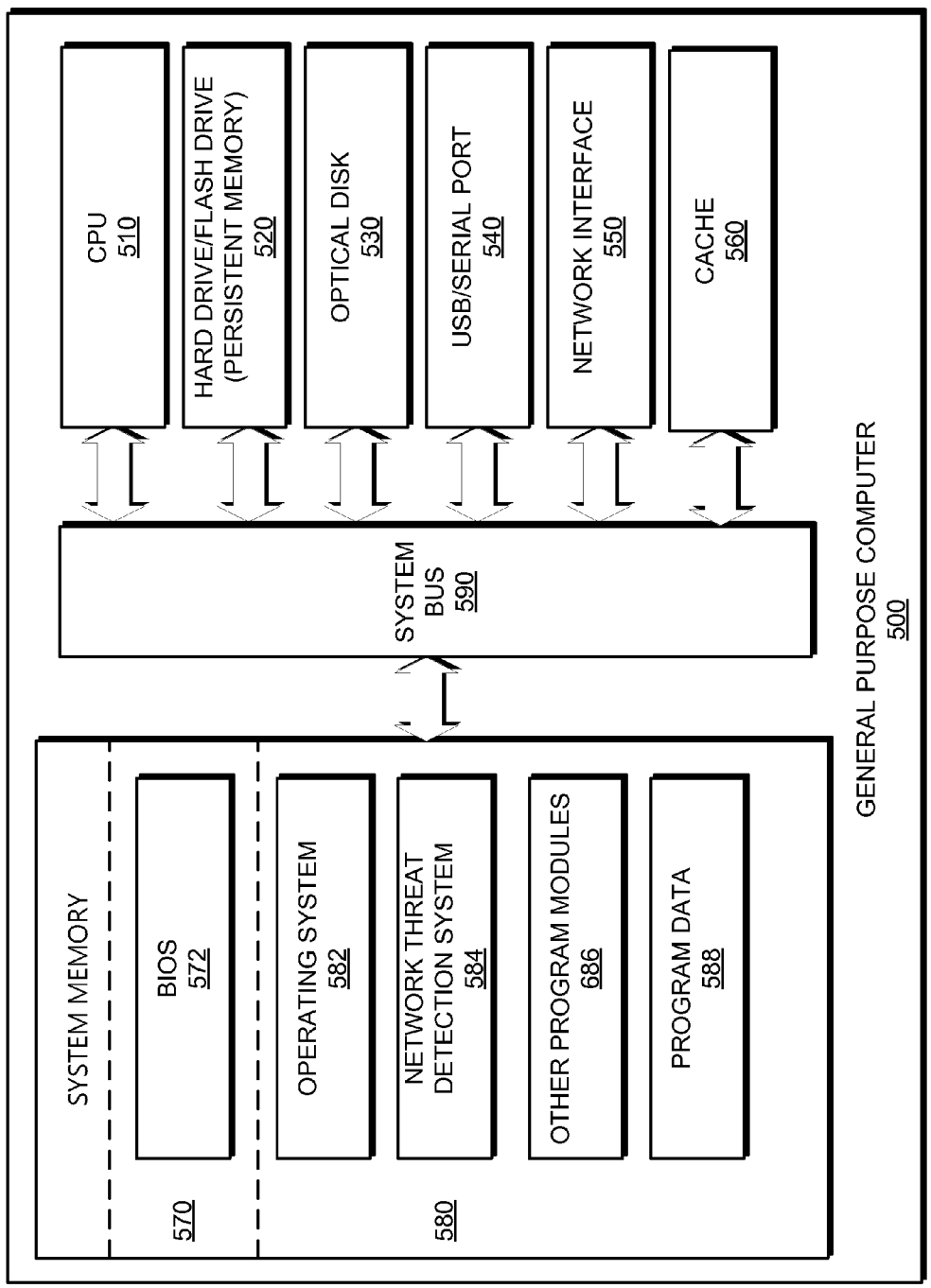
FIG. 5 is an exemplary computing system for implementing various aspects of the systems and methods described herein.

FIG. 5 illustrates an example general purpose computer 500 that may be useful in implementing the described technology. The example hardware and operating environment of FIG. 5 for implementing the described technology includes a general purpose computing device in the form of a personal computer, server, or other type of computing device. In the implementation of FIG. 5, for example, the general purpose computer 500 includes a processor 510, a cache 560, a system memory 570, 580, and a system bus 590 that operatively couples various system components including the cache 560 and the system memory 570, 580 to the processor 510. There may be only one or there may be more than one processor 510, such that the processor of the general purpose computer 500 comprises a single central processing unit (CPU), or a plurality of processing units, commonly referred to as a parallel processing environment. The general purpose computer 500 may be a conventional computer, a distributed computer, or any other type of computer; the invention is not so limited.

The system bus 590 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 570 and random access memory (RAM) 580. A basic input/output system (BIOS) 572, containing the basic routines that help to transfer information between elements within the general purpose computer 500 such as during start-up, is stored in ROM 570. The general purpose computer 500 further includes one or more hard disk drives or flash-based drives 520 for reading from and writing to a persistent memory such as a hard disk, a flash-based drive, and an optical disk drive 530 for reading from or writing to a removable optical disk such as a CD ROM, DVD, or other optical media.

The hard disk drive 520 and optical disk drive 530 are connected to the system bus 590. The drives and their associated computer-readable media provide nonvolatile storage of computer-readable instructions, data structures, program engines and other data for the general purpose computer 500. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program engines may be stored on the hard disk 520, optical disk 530, ROM 570, or RAM 580, including an operating system 582, a network threat detection system 584 such as the one described above, one or more application programs 586, and program data 588. A user may enter commands and information into the general purpose computer 500 through input devices such as a keyboard and pointing device connected to the USB or Serial Port 540. These and other input devices are often connected to the processor 510 through the USB/serial port interface 540 that is coupled to the system bus 590, but may be connected by other interfaces, such as a parallel port. A monitor or other type of display device may also be connected to the system bus 590 via an interface, such as a video adapter 560. In addition to the monitor, computers typically include other peripheral output devices (not shown), such as speakers and printers.

The general purpose computer 500 may operate in a networked environment using logical connections to one or more remote computers. These logical connections are achieved by a network interface 550 coupled to or a part of the general purpose computer 500; the invention is not limited to a particular type of communications device. The remote computer may be another computer, a server, a router, a network PC, a client, a peer device, and typically includes many or all of the elements described above relative to the n general purpose computer 500. The logical connections include a local-area network (LAN) a wide-area network (WAN), or any other network. Such networking environments are commonplace in office networks, enterprise-wide computer networks, intranets and the Internet, which are all types of networks.

The network adapter 550, which may be internal or external, is connected to the system bus 590. In a networked environment, programs depicted relative to the general purpose computer 500, or portions thereof, may be stored in the remote memory storage device. It is appreciated that the network connections shown are example and other means of and communications devices for establishing a communications link between the computers may be used.

The embodiments of the invention described herein are implemented as logical steps in one or more computer systems. The logical operations of the present invention are implemented (1) as a sequence of processor-implemented steps executing in one or more computer systems and (2) as interconnected machine or circuit engines within one or more computer systems. The implementation is a matter of choice, dependent on the performance requirements of the computer system implementing the invention. Accordingly, the logical operations making up the embodiments of the invention described herein are referred to variously as operations, steps, objects, or engines. Furthermore, it should be understood that logical operations may be performed in any order, unless explicitly claimed otherwise or a specific order is inherently necessitated by the claim language.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

The invention claimed is:

1. A system for identifying malicious threats on a network comprising:
   a computing device including a processor coupled to a system memory, the system memory storing instructions for execution on the processor, the instructions configured to cause the processor to:
   retrieve a network data associated with at least one of an IP address or a domain, wherein the network data comprises information indicating an amount of data transceived by at least one element of the network;
   analyze the network data and identify a malicious network threat, including identifying at least one bot command computer by tracing at least some of the data transceived by the at least one element of the network to a bot, and then tracing communications between the bot and the bot command computer;
   push a notification including a mitigating action for the malicious network threat to a third party device; and
   cause the mitigating action to be performed to neutralize the malicious network threat.

2. The system of claim 1, wherein the network data is retrieved from an edge router, wherein the network data comprises a snapshot of traffic being routed through the edge router.

3. The system of claim 1, further comprising a traffic measurement aggregator module logically connected to an edge router interface.

4. The system of claim 1, wherein the network data comprises data from a border gateway protocol table associated with a primary computer network's connectivity relationships with at least one secondary network.

5. The system of claim 1, wherein the instructions are further configured to cause the processor to:
normalize the network data to a standard format;
decorate the network data with at least one tag that identifies the network activity data;
store the network data in a database;
weight the network data according to a threat associated with the data; and
generate a risk score for the weighted data.

6. The system of claim 5, wherein the instructions are further configured to cause the processor to generate the risk score by:
compare a new activity at the IP address or the domain to a past activity at the IP address or the domain;
determine whether the new activity fits a profile for a malicious IP address or domain;
correlate the risk score with a previous malicious threat; and
adjust the risk score according to the correlation.

7. The system of claim 6, wherein the instructions are further configured to cause the processor to predict a network based attack according at least the risk score.

8. The system of claim 1, wherein the mitigating action comprises at least one of a null routing the malicious network threat, adjusting an access control list (ACL) to block the malicious network threat, publishing a list identifying a bad actor committing the malicious network threat, or logically separating the IP address or domain from a network.

9. A method for identifying malicious threats on a network comprising:
retrieving a network data associated with at least one of an IP address or a domain, wherein the network data comprises information indicating an amount of data transceived by at least one element of the network;
analyzing the network data to identify a malicious network threat, including identifying at least one bot command computer by tracing at least some of the data transceived by the at least one element of the network to a bot, and then tracing communications between the bot and the bot command computer;
pushing a notification including a mitigating action for the malicious network threat to a third party device; and
causing the mitigating action to be performed to neutralize the malicious network threat.

10. The method of claim 9, wherein the network data is retrieved from an edge router.

11. The method of claim 10, further comprising measuring a rate of data transceived by the edge router at a measurement aggregator module logically connected to an edge router interface.

12. The method of claim 11, wherein the network data comprises data from a border gateway protocol table associated with a primary computer network's connectivity relationships with at least one secondary network.

13. The method of claim 9, further comprising:
normalizing the network data to a standard format;
decorating the network data with at least one tag that identifies the network activity data;
storing the network data in a database;
weighing the network data according to a threat associated with the data; and
generating a risk score for the weighted data.

14. The method of claim 13, wherein the risk score is generated by:
comparing a new activity at the IP address or the domain to a past activity at the IP address or the domain;
determining whether the new activity fits a profile for a malicious IP address or domain;
correlating the risk score with a previous malicious threat; and
adjust the risk score according to the correlation.

15. The method of claim 14, further comprising predicting a network based attack according at least the risk score.

16. The method of claim 9, wherein the mitigating action comprises at least one of a null routing the malicious network threat, adjusting an access control list (ACL) to block the malicious network threat, publishing a list identifying a bad actor committing the malicious network threat, or logically separating the IP address or domain from a network.

* * * * *